United States Patent [19]

Shibata et al.

[11] Patent Number: 5,396,555
[45] Date of Patent: Mar. 7, 1995

[54] POWER AND SIGNAL TRANSMISSION SYSTEM

[75] Inventors: Tomohisa Shibata; Kazuyuki Matsui, both of Tokyo, Japan

[73] Assignee: Kabushiki Kaisha Toshiba, Kawasaki, Japan

[21] Appl. No.: 852,538

[22] Filed: Mar. 17, 1992

[30] Foreign Application Priority Data

Mar. 19, 1991 [JP] Japan .................. 3-054826

[51] Int. Cl.⁶ .............................................. H04N 9/08
[52] U.S. Cl. .................................. 379/412; 379/413
[58] Field of Search ............... 379/322, 324, 413, 387; 340/310 R, 310 A, 310 CP

[56] References Cited

U.S. PATENT DOCUMENTS

| | | | |
|---|---|---|---|
| 4,564,726 | 1/1986 | Ibata | 519/413 |
| 4,631,366 | 12/1986 | Takato et al. | 379/524 X |
| 4,764,956 | 8/1988 | Rosch et al. | 379/413 |
| 4,908,856 | 3/1990 | Poletto | 379/413 |
| 4,935,960 | 6/1990 | Takato et al. | 379/413 |
| 4,964,158 | 10/1990 | Okochi et al. | 379/413 X |
| 4,982,422 | 1/1991 | Itoh et al. | 379/413 X |

*Primary Examiner*—James L. Dwyer
*Assistant Examiner*—Creighton Smith
*Attorney, Agent, or Firm*—Finnegan, Henderson, Farabow, Garrett & Dunner

[57] ABSTRACT

A power and signal transmission system performs a transmission of a power from a first communication device to a second communication device via a transmission path as well as a transmission of a signal between the first and second communication devices via the transmission path. The first communication device includes a high voltage power source and a first pair of active inductances each having a low DC impedance and a high AC impedance, through which the power from the high voltage power source is supplied to the transmission path, and the second communication device includes a DC/DC converter and a second pair of active inductances each having a low DC impedance and a high AC impedance, through which the power transmitted via the transmission path is supplied.

19 Claims, 6 Drawing Sheets

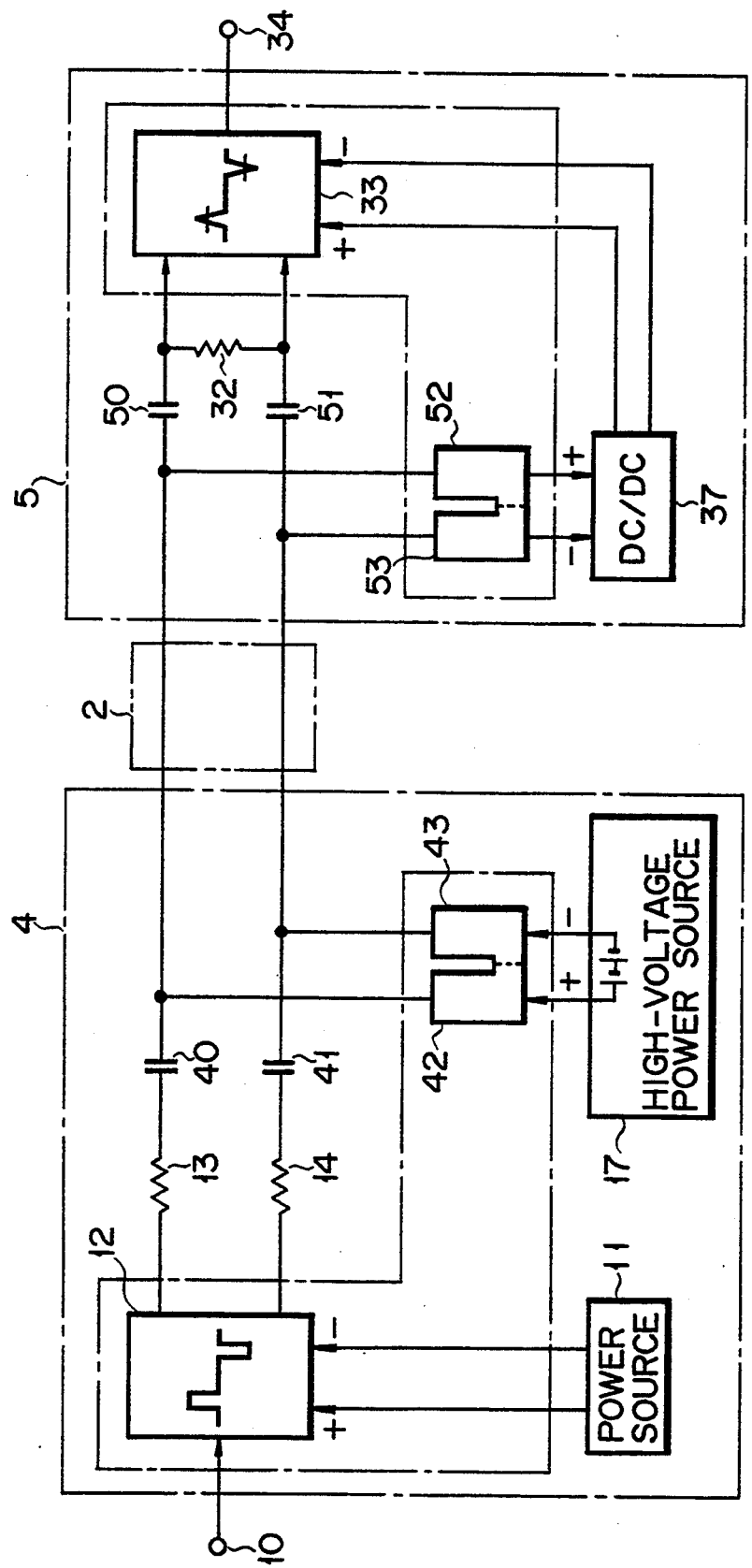
F I G. 1

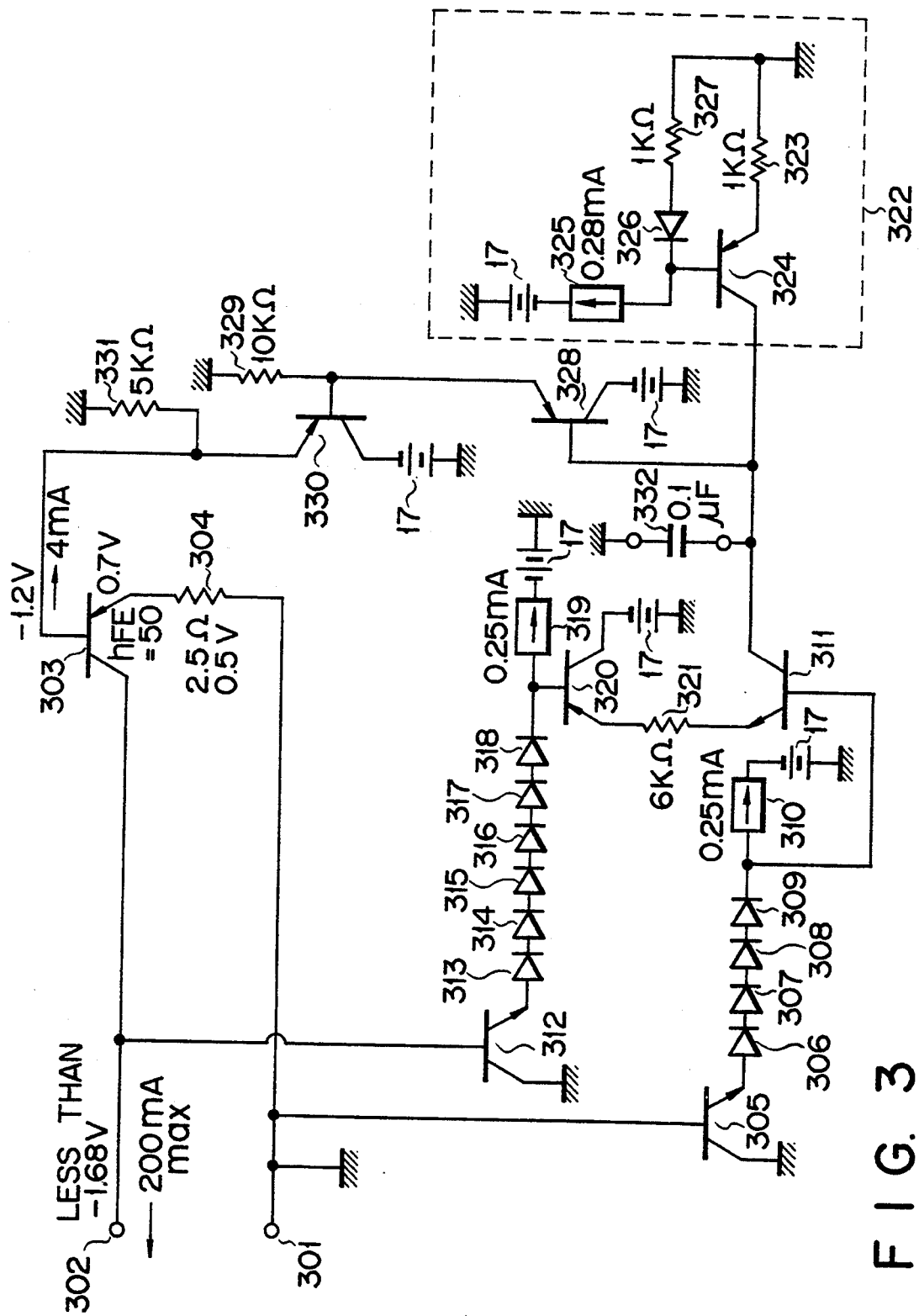
F I G. 3

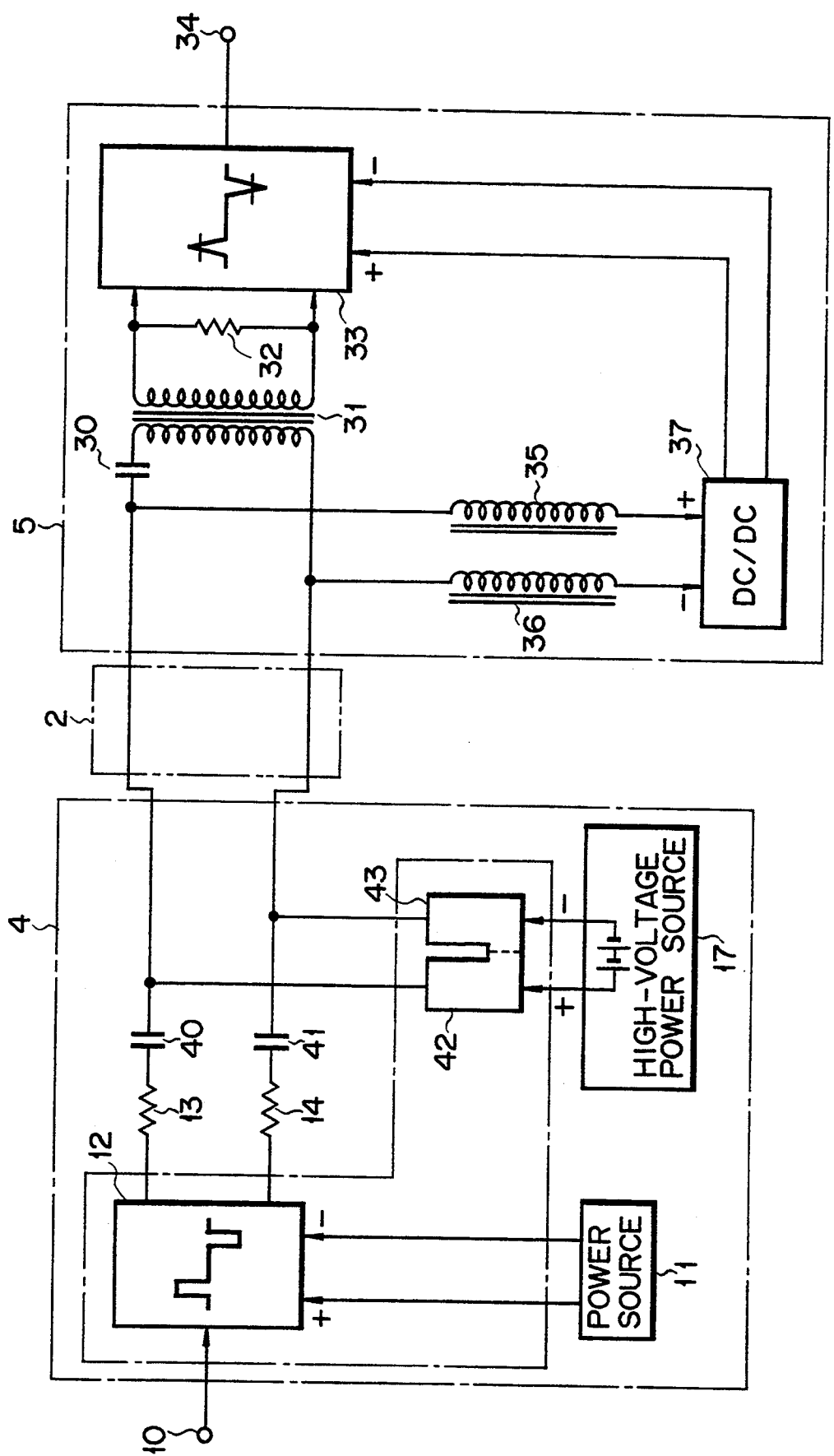
F I G. 6

POWER AND SIGNAL TRANSMISSION SYSTEM

BACKGROUND OF THE INVENTION

1. Field of the Invention

The present invention relates to a power and signal transmission system which makes signal transmission via lines and permits transmission of power by using lines such as those used in a public telephone network.

2. Description of the Related Art

In general, in exchanges, etc., power transmission is made via signal-transmitting lines. In a typical exchange, first and second communication devices are connected to each other via communication lines. A digital signal is applied to the input terminal of the transmitting circuit of the first communication device and is converted by a transmitting circuit, which is powered from a power source, to a signal having no direct current component. The converted signal is, in turn, transmitted on the lines via a signal-source resistor and a transformer. The receiving circuit of the second communication device receives the signal transmitted over the lines. In the first communication device, a high-voltage source delivers a high-voltage from the center tap of the secondary winding of a transformer, connected by a signal-short-circuiting capacitor, to the lines. The high voltage supplied to the lines is lowered by line resistance and then applied to a DC-to-DC conversion circuit in the second communication device. The conversion circuit converts the input high voltage to a power supply voltage required with a receiving circuit in the second communication device.

However, the use of transformers and choke coils for power transmission will increase the cost and make the system large because they are costly and large. In addition, there are disadvantages in that the assembly of the transformers and the choke coils takes a lot of time and labor, and the assembly cost also increases.

SUMMARY OF THE INVENTION

It is therefore an object of the present invention to provide a power and signal transmission system which permits large components, such as transformers, choke coils, etc. to be eliminated and which is thus small in size and low in device and assembly costs.

According to a first aspect of the present invention, there is provided a power and transmission system comprising a first communication device having a transmitting circuit for transmitting an input signal on lines via a pair of signal resistors and a first pair of DC blocking capacitors, and transmitting power on the lines, and a second communication device having converting means, such as a DC-to-DC converter, for converting the power transmitted from the first communication device over the lines to operating power, and a second communication circuit, operated from the operating power, for receiving the input signal via a second pair of DC blocking capacitors and a terminal resistor to reproduce the input signal. The first communication device transmits the power generated from a high-voltage source on the lines through a first pair of active inductances having low DC impedances and high AC impedance. The receiving side communication device extracts the power transmitted over the lines by using a second pair of active inductances and applies it to the converting means.

According to a second aspect of the present invention, there is provided a power and signal transmission system having a function to remove common mode components from a signal to be transmitted on the lines.

According to a third aspect of the present invention, there is provided a power and signal transmission system in which each of first and second pairs of active inductances comprising first terminal connected to a line, a first power transistor having its collector connected to the first terminal, a second terminal connected to a power source or a conversion means, a first resistor connected between the emitter of the power transistor and the second terminal, a first level shift circuit for level shifting a voltage on the first terminal, a second level shift circuit for level shifting a voltage on the second terminal, a current source having a PNP transistor having its base supplied with an output voltage of the first level shift circuit, an NPN transistor having its base supplied with an output voltage of the second level shift circuit, and a second resistor connected between the emitters of the PNP and NPN transistors, a constant current source connected as a load to the collector of either the PNP transistor or the NPN transistor, a capacitor having its one end connected to a point of connection between the collector of either the PNP transistor or the NPN transistor and the constant current source, and a third level shift circuit for level shifting a voltage on the connection point to apply the level shifted voltage to the base of the power transistor, the level shift amount introduced by the first level shift circuit and the PNP transistor and the level shift amount introduced by the second level shift circuit and the NPN transistor being made equal to each other and the second pair of active inductances obtaining load currents of emitter followers driving the bases of the power transistors from constant current sources each using a current mirror.

With the power and signal transmission system according to the first aspect, power is transmitted on the line through the active inductance with the flow of power into the transmitting circuit and the receiving circuit blocked by the capacitors. The active inductance allows only power to be extracted. Thus, the necessity of a transformer and a choke coil is eliminated.

With the power and signal transmission system according to the second aspect, in the transmitting circuit, output signals of flip-flops which represent the polarity of a signal, such as AMI codes, are combined and transmitted on the line with their differential characteristics taken into account. Thus, the transmission of common mode components on the line can be prevented.

With the power and signal transmission system according to the third aspect, the level shift amounts for voltages on the two input terminals, including level shift amounts introduced by transistors constructing current sources, are made equal to each other, and the voltage between the input terminals does not vary with temperature. Thus, the voltage between the input terminals becomes small. With the active inductance used in the receiving side communication device, the load current of the emitter follower driving the base of the power transistor is obtained in constant current from the terminal on the side of the line using the current mirror. Thus, the voltage between the two input terminals becomes small.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a power and signal transmission system according to an embodiment of the present invention;

FIG. 3 is a circuit diagram of the active inductance of FIG. 1;

FIG. 6 is a block diagram of a power and signal transmission system according to still another embodiment of the present invention.

DETAILED DESCRIPTION OF THE PREFERRED EMBODIMENTS

Figure 2:
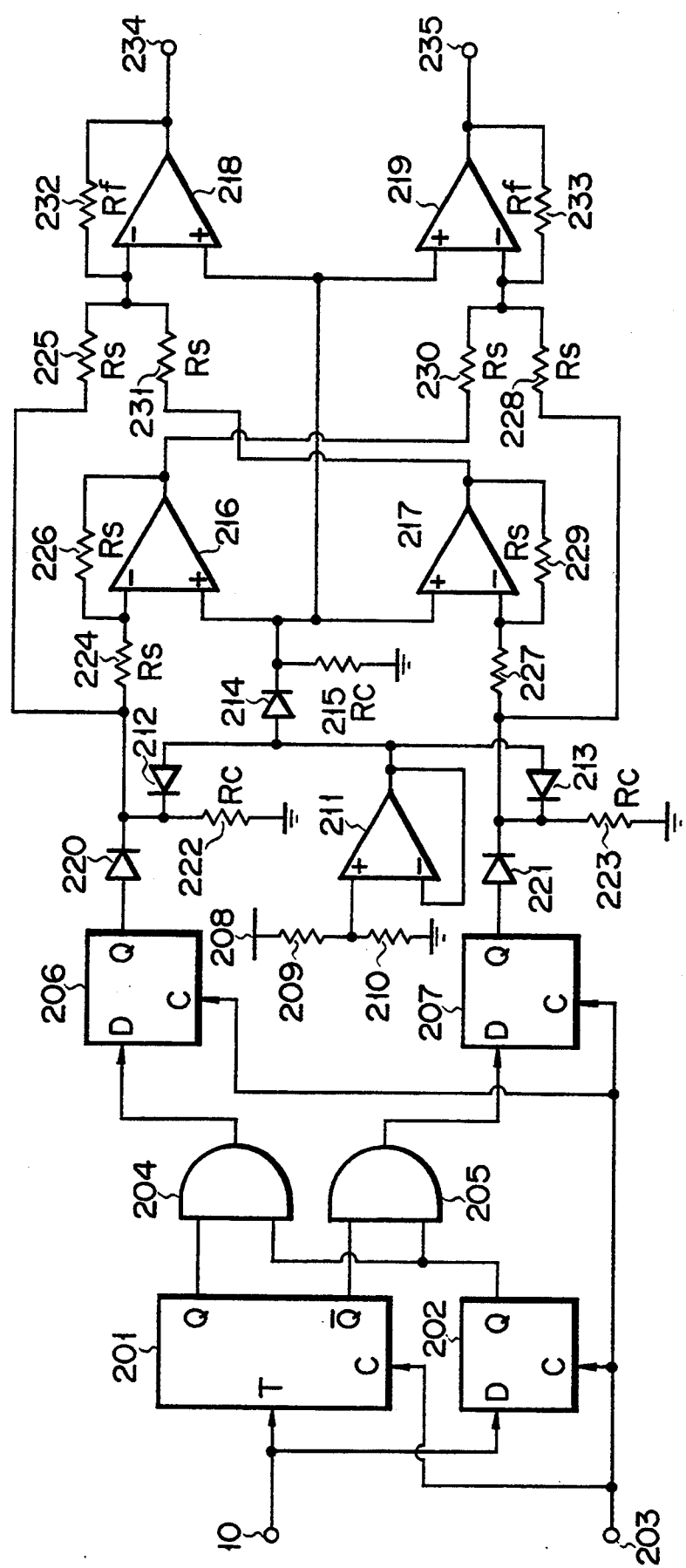
FIG. 2 is a circuit diagram of the transmitting circuit of FIG. 1.

In a power and signal transmission system shown in FIG. 1, a first communication device (transmitting side communication device) 4 and a second communication device (receiving side communication device) 5 are connected by a transmission path or a pair of transmission lines 2. The transmitting side communication device 4 includes an input terminal 10 to receive a digital signal and a transmitting circuit 12 powered from a power source 11. The transmitting circuit 12 converts the input digital signal to a signal having no direct current component. The transmitting circuit has two output terminals each of which is connected to a respective one of the lines 2 through a series combination of a signal-source resistor 13 (14) and a capacitor 40 (41). The lines 2 are connected to a high-voltage source 17 through active inductances 42 and 43 to receive high-voltage power from the source. The active inductances 42 and 43 and the transmitting circuit 12 may be integrated into a single semiconductor chip.

The receiving side communication device 5 includes active inductances 52 and 53 for extracting the power transmitted from the transmitting side communication device via the lines 2, a DC-to-DC converter 37 connected to the output terminals of the active inductances 52 and 53, and a receiving circuit 33 powered from the converter 37. The active inductances 52 and 53 and the receiving circuit 33 may be integrated into a single semiconductor chip.

The receiving side communication device 5 further includes DC blocking capacitors 50 and 51 that are connected between the lines 2 and the receiving circuit 33 in order to prevent application of the power, fed to the lines by the high-voltage power source 17, to the receiving circuit 33.

With the arrangement described above, in the transmitting side communication device 4, the power is fed to the lines 2 through the active inductances 42 and 43 while being prevented by the DC blocking capacitors 40 and 41 from flowing into the transmitting circuit 12. In the receiving side communication device 5, the DC blocking capacitors 50 and 51 prevent the power from flowing into the receiving circuit 33, and the active inductances 52 and 53 extract only the power. Hence, the necessity for transformers and choke coils that are large and costly is eliminated. This permits the transmitting side communication device 4 and the receiving side communication device 5 to be made small and inexpensive.

In the case of the above arrangement, it will be considered that the transmitting circuit 12 directly drives the lines 2. If, therefore, the lines 2 were driven by the transmitting circuit 12 with common mode components, much unwanted electromagnetic radiation would be generated. In the present embodiment, therefore, the transmitting circuit 12 is arranged so as not to generate common mode components.

FIG. 2 is a circuit diagram of the transmitting circuit 12 that is arranged so as not to generate common mode components. In this circuit, an input digital signal from the terminal 10 is applied to a toggle flip-flop 201 and a D-type flip-flop 202. The clock inputs of the flip-flops 201 and 202 are driven by a clock signal 203 (not shown in FIG. 1) synchronized with the input digital signal applied to the terminal 10. The toggle flip-flop 201 has its uncomplemented output connected to one of two inputs of an AND gate 204 and its complemented output connected to one of two inputs of an AND gate 205. The output of the D-type flip-flop 202 is connected to the other input of each of the AND gates 204 and 205. Thereby, the outputs of the AND gates 204 and 205 alternately go high each time the input digital signal goes high.

In order to avoid an error signal due to a difference in operating speed between the toggle flip-flop 201 and the D-type flip-flop 202, the outputs of the AND gates 204 and 205 are applied to D-type flip-flops 206 and 207, respectively, and are shaped by the clock signal 203. The outputs of the D-type flip-flops 206 and 207, like the outputs of the AND gates 204 and 205, alternately go high each time the input digital signal goes high. It is preferable that the logic circuits, including the D-type flip-flops 206 and 207, be constructed from CMOS circuits in which the high level corresponds to a power supply voltage and the low level corresponds to ground potential.

In FIG. 2, circuits succeeding the flip-flops 206 and 207, which perform ternary coding and differentiation, and which remove the common mode (in-phase) components present at the outputs of flip-flops 206 and 207, are arranged as described below.

A reference voltage is produced by dividing a supply voltage 208 with resistors 209 and 210 and then applied to the anodes of clipping diodes 212, 213 and 214 via a voltage follower 211 formed of an operational amplifier. The cathode of the diode 214 is connected to ground by a resistor 215 (Rc in value), producing a clipping level which is applied to non-inverting input terminals of operational amplifiers 216, 217, 218 and 219. The outputs of the D-type flip-flops 206 and 207 are connected to the anodes of drive diodes 220 and 221, respectively. The diodes 220 and 221 have their cathodes connected to the cathodes of the clipping diodes 212 and 213, respectively, and connected to ground by resistors 222 and 223 (equal in value to the resistor 215, i.e., Rc), respectively. The cathode voltage of each of the drive diodes 220 and 221 when the output of its associated D-type flip-flop goes high (i.e., goes to the supply voltage) is equal to the supply voltage minus its anode-to-cathode voltage. On the other hand, the cathode of each drive diode is maintained at the clipping level with the output of the corresponding D-type flip-flop low (i.e., at ground potential). The voltage amplitude at the cathode of each of the drive diodes 220 and 221 is taken as a clipping amplitude.

Next, connections associated with the operational amplifiers 216, 217, 218 and 219 will be described.

The cathode of the drive diode 220 is connected to the inverting input terminal of the operational amplifier 216 by a resistor 224 (Rs in value) and to the inverting input terminal of the operational amplifier 218 by a resistor 225 (Rs in value). The inverting input terminal of the operational amplifier 216 is connected to its output terminal by a resistor 226 (Rs in value). The cathode of the drive diode 221 is connected to the inverting input terminal of the operational amplifier 217 by a resistor 227 (Rs in value) and connected to the inverting input terminal of the operational amplifier 219 by a resistor 228 (Rs in value). The inverting input terminal of the operational amplifier 217 is connected to its output terminal by a resistor 229 (Rs in value). The output terminal of the operational amplifier 216 is connected to the inverting input terminal of the operational amplifier 219 by a resistor 230 (Rs in value). The output terminal of the operational amplifier 217 is connected to the inverting input terminal of the operational amplifier 218 by a resistor 231 (Rs in value). The operational amplifier 218 has its inverting input terminal and output terminal connected together by a resistor (Rf in value). The operational amplifier 219 has its inverting input terminal and output terminal connected together by a resistor (Rf in value). The output terminal of the operational amplifier 218 serves as a first output terminal 234 of the transmitting circuit 12, which is connected to the resistor 13 in FIG. 1. The output terminal of the operational amplifier 219 serves as a second output terminal 235 of the transmitting circuit 12, which is connected to the resistor 14 in FIG. 1.

The transmitting circuit 12 arranged as described above operates in the following manner.

The outputs of the D-type flip-flops 206 and 207 will never go high simultaneously. Suppose here that the output of the flip-flop 206 is at a high level, while the output of the flip-flop 207 is at a low level. In this case, the cathode of the diode 221 is at the same clipping level as the non-inverting input terminals of the operational amplifiers 217,219, which has no effect on the first and second output terminals 234 and 235.

On the other hand, the cathode of the diode 220 is at a level higher than the clipping level by the clipping amplitude. Thus, by the resistors 224, 226 and the operational amplifier 216, the output of the operational amplifier 216 is caused to go to a level lower than the clipping level by the clipping amplitude, so that the second output terminal 235 is caused to go to a level higher than the clipping level by the clipping amplitude×(Rf/Rs) by the resistors 230 and 233 and the operational amplifier 219.

On the other hand, the resistors 225 and 232 and the operational amplifier 518 cause the first output terminal 234 to go to a level lower than the clipping level by the clipping amplitude×(Rf/Rs). That is, from the first and second output terminals 234 and 235 is obtained a differential output of 2×clipping amplitude×(Rf/Rs) that is centered at the clipping level and positive with respect to the first output terminal.

When the output of the D-type flip-flop 206 is low, and the output of the D-type flip-flop 207 is high, a differential output of 2×clipping amplitude×(Rf/Rs) that is centered at the clipping level and positive with respect to the second output terminal 234 will be obtained from the first and second output terminals 234 and 235 because the circuit arrangement is symmetrical.

When the outputs of the D-type flip-flops 206 and 207 are both low, the cathodes of the diodes 220 and 221 will be at the clipping level. Thus, the first and second output terminals 234 and 235 will both be at the clipping level. Hence, the transmitting circuit of FIG. 2 will produce an AC-common-mode-component- free output that is centered at the clipping level. Note that, although the clipping level is a DC common mode component, it can be blocked by the DC blocking capacitors 124 and 125 of FIG. 1.

If problems should arise with the occurrence of transient common mode components due to delays introduced by the operational amplifiers 216 and 217, voltage followers could be connected between the cathode of the diode 220 and the resistor 225 and between the cathode of the diode 221 and the resistor 228 to match the delays with each other. In this case, in order to lower the common mode input range, it is desired that all the diodes should be doubled.

By using the transmitting circuit arranged as described above, flip-flops' output signals representing the polarity of a signal, such as AMI codes, are combined taking their differential characteristic into consideration and then transmitted on the lines 2. As a result, common mode components will never be transmitted on the lines 2. Therefore, the arrangement of FIG. 1 in which the transmitting circuit 12 directly drives the lines 2 without using transformers will not produce unwanted electromagnetic radiation. Note that the generation and combination of the differential components can be performed by using a single power supply of the same voltage as the supply voltage for the logic circuits because the ground side of the flip-flop outputs is diode-clipped.

Conventional active inductances, as used in filters, etc., are great in loss and thus are not suited for power transmission as in the present embodiment. The present embodiment therefore uses active inductances having the following novel features.

Figure 4:
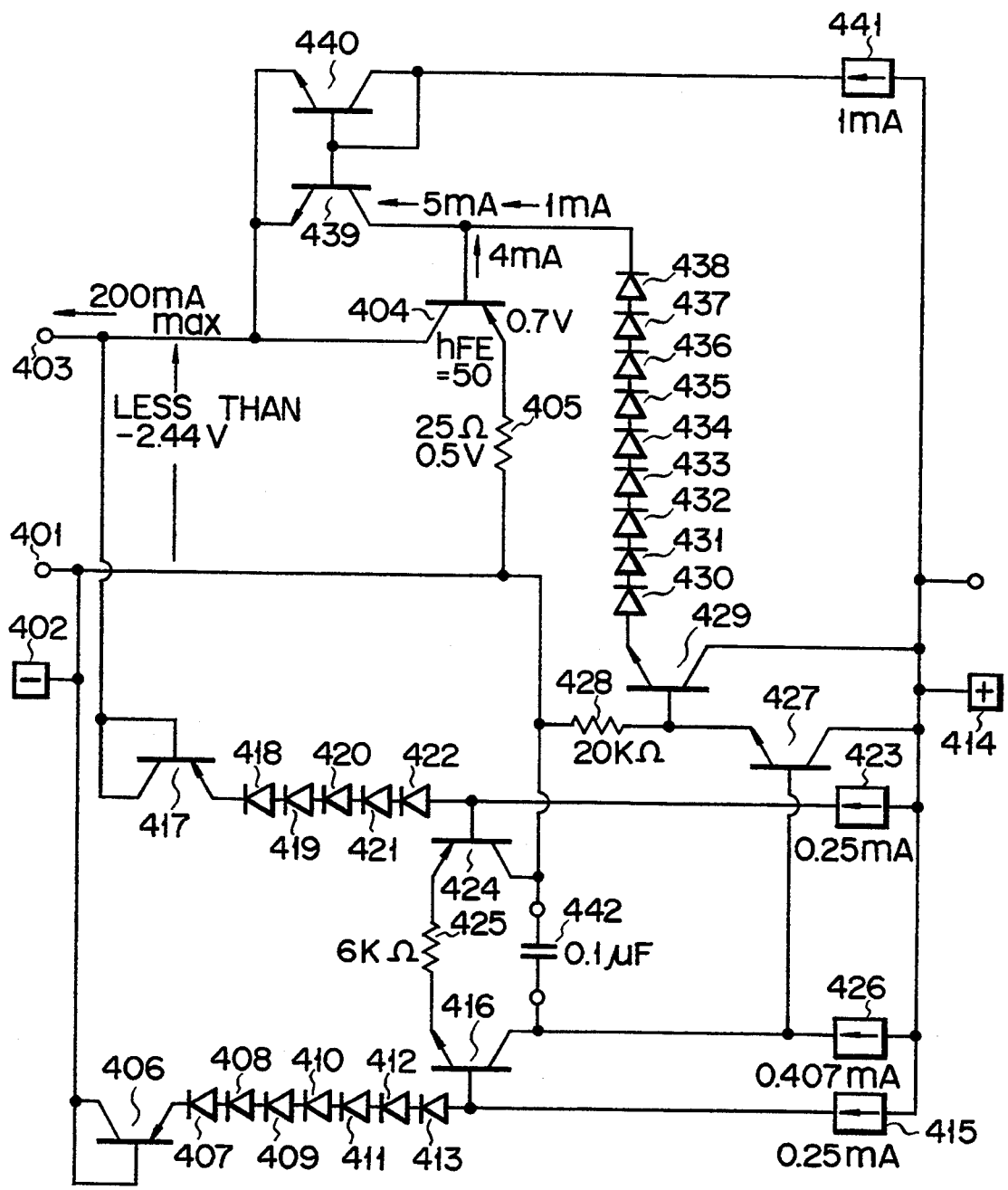
FIG. 4 is a circuit diagram of the active inductance of FIG. 1.

FIGS. 3 and 4 are circuit diagrams of the active inductances. More specifically, FIG. 3 is a circuit diagram of the active inductance 42 connected to the plus terminal of the high-voltage power supply 17 of FIG. 1, while FIG. 4 shows the active inductance 53 connected to the minus terminal of the DC-to-DC conversion circuit 37 of FIG. 1.

These active inductances employ the principle of gyrators in which current and voltage of a load capacitor appear to be replaced with each other. It is important in the active inductance used in the present embodiment that DC voltage between its terminals be decreased to reduce voltage loss introduced by the active inductance.

First, the active inductance shown in FIG. 3 will be described. A terminal 301 of the active inductance, connected to the plus terminal of the high-voltage source 17 of FIG. 1 that is connected to ground, is also connected to ground. The other terminal 302 of the active inductance is connected to that one of the lines 2 which is connected to the capacitor 40 shown in FIG. 1. In order to make the description specific, it is assumed herein that a maximum current of 200 mA flows out of the terminal 302.

The terminal 302 is connected to the collector of a PNP power transistor 303, which has its emitter connected to the terminal 301 through a 2.5-Ω resistor 304.

The voltage on the terminal 301 is level shifted by an emitter follower 305, consisting of an NPN transistor having its base connected to the terminal 301, diodes 306 to 309 connected in series with the emitter of the emitter follower, each diode being formed of a diode-connected transistor, and a 0.25-mA constant current source 310 connected to the high-voltage source 17, for application to the base of an NPN transistor 311.

The voltage on the terminal 302 is level shifted by an emitter follower 312, consisting of an NPN transistor having its base connected to the terminal 302, diodes 313 to 318 connected in series with the emitter of the emitter follower, each diode being formed of a diode-connected transistor, and a 0.25-mA constant current source 319 connected to the high-voltage source 17, and then applied to the base of a PNP transistor 320.

A 6-kΩ resistor 321 is connected between the emitters of the transistors 311 and 320. The voltage across the resistor 321 is equal to the voltage between the terminals 301 and 302, irrespective of ambient temperature. This is because the level shift amounts for the voltages on the terminals 301 and 302 are equal to each other. More specifically, although the number of the level-shift diodes on the side of the terminal 301 is smaller than that on the side of the terminal 302 by two, the base-to-emitter voltage of transistor 311, corresponding to the level shift amount of one diode, is added to the level shift amount of four level-shift diodes on the side of the terminal 301, while the base-to-emitter voltage of transistor 320 that also corresponding to the level shift amount of one diode is subtracted from the level shift amount of six level-shift diodes on the side of the terminal 302.

The collector of the PNP transistor 320 is connected to the high-voltage source 17. A constant current source 322 for outputting a constant current is connected the collector of the NPN transistor 311 which converts the voltage between terminals 301 and 302 to current and sinks it. Thereby, the voltage between the terminals 301 and 302 will be amplified very greatly and then output to the collector of the transistor 311. The output of the constant current source 322 is the collector of a PNP transistor 324 having its emitter connected to ground through a 1-kΩ resistor 323. The transistor 324 has its base connected to a constant current source 325 connected to the high-voltage source 17 and to a series combination of a diode-connected transistor 326 and a 1-kΩ resistor 327 that is grounded. Thus, the constant current source will provides an output current of about 0.28 mA.

To the collector of the NPN transistor 311 is connected the base of a PNP emitter-follower transistor 328 having its collector connected to the high-voltage source 17 and its emitter connected to a 10-kΩ load resistor 329 that is grounded and to the base of a PNP emitter-follower transistor 330. The PNP transistor 330 is connected at its collector to the high-voltage source 17 and at its emitter to a 5-kΩ load resistor 331 that is connected to ground and to the base of the PNP power transistor 303. That is, the collector of the NPN transistor 311 and the base of the PNP transistor 303 are connected by two emitter-follower stages.

The reason for the connection of the collector of NPN transistor 311 and the base of PNP power transistor 303 by two emitter-follower stages is that the direct-current amplification factor hFE of transistors in high voltage integrated circuits is small, of the order of 50, and considerations have been taken into account so that the drive current of the power transistor will not become a load of the collector output of the NPN transistor 311. Between the collector of the NPN transistor 311 and ground is connected a built-on 0.1-μF capacitor 322 which is to be converted to an inductance.

The voltage between the active-inductance terminals 301 and 302, that is, the voltage on the terminal 302 (the terminal 301 is grounded) is defined as follows.

Assuming that a maximum current of 200 mA flows, there are a voltage drop of 0.5 V across the resistor 304, 0.7 V across the emitter-to-base path of the power transistor 303, a signal voltage magnitude of 0.42 V, and 0.002×30 V, an increment of the base-to-emitter voltage of the power transistor 303 when temperature falls by 30° on the assumption that the power transistor 303 is not driven into saturation until the collector voltage reaches the base voltage. Thus, the voltage on the terminal 302 will be not more than $$-0.5\text{ V} - 0.7\text{ V} - 0.002 \times 30\text{ V} - 0.42\text{ V} = -1.68\text{ V}$$

In order to minimize the power transmission loss introduced by the active inductance taking this point into account, the following trimming is performed to adjust the voltage on the terminal 302 to −1.68 V. That is, trimming is performed on the 0.28-mA constant current source 325 so as to adjust the voltage on the terminal 302 to −1.68 V while the terminal 302 is driven with a constant current (not more than 200 mA). Further, as compensation for variations in the base-to-emitter voltage of the PNP power transistor 303, trimming is performed on the 2.5-Ω resistor 304, with the constant drive current set to 200 mA, so as to set the base of the transistor 303 to −1.2 V.

From the following description it will be understood that the circuit described above operates as an active inductance.

When the voltage on the terminal 302 is varied, the collector voltage of the NPN transistor 311 will vary greatly. As a result, the base voltage of the PNP power transistor 303 will vary greatly, so that the current on the terminal 302 varies greatly. That is, the direct current resistance is zero. On the other hand, when a high-frequency voltage is applied to the terminal 302, the collector of the NPN transistor 311 will be bypassed by the 0.1-μF capacitor 332, so that a high-frequency voltage is not developed at its collector. Thus, no high-frequency current flows through the terminal 302, so that the high-frequency impedance becomes high. In fact the circuit of FIG. 3 has an inductance of $$2.5\Omega \times 6\text{k}\Omega \times 0.1\ \mu\text{F} = 1.5\text{ mH}$$

As can be seen from the foregoing, the active inductance shown in FIG. 3 meets requirements of power active inductances which allow the flow of a large current of the order of 200 mA.

In addition, the level shift amounts for voltages on the terminals 301 and 302, including level shift amounts introduced by the transistors 311 and 320, are made equal to each other. Thus, the voltage between the terminals 301 and 302 will not vary with temperature and the voltage between two input terminals becomes small. Furthermore, by trimming the constant current source 325 and the resistor 304, the voltage between the terminals 301 and 302 can be reduced to the lowest minimum. Therefore, the loss can be controlled to the minimum.

The active inductance 43 on the minus terminal side of the high-voltage source 17 of FIG. 1 will also be realized by making some modifications, such as interchanging of PNP transistors with NPN transistors and vice versa, to the circuit of FIG. 3.

Next, the active inductance 53 connected to the minus terminal of the DC-to-DC converter 37 of FIG. 1 will be described with reference to FIG. 4. In FIG. 4, a terminal 401 of the active inductance 53 is connected to a minus input terminal 402 of the DC-to-DC converter 37. The other terminal 403 of the active inductance 53 is connected to one of the lines 2 of FIG. 1 that is connected to the capacitor 51. Hereinafter, the active inductance of FIG. 4 will also be described on the assumption that a maximum current of 200 mA flows out of the terminal 403.

The terminal 403 is connected to the collector of a PNP power transistor 404, which has its emitter connected to the terminal 401 by a 2.5-Ω resistor 405. The voltage on the terminal 401 is level shifted by diode-connected PNP transistors 406 to 413 and a 0.25-mA constant current source 415 that is connected to the plus input terminal 414 of the DC-to-DC converter 37 and then applied to the base of an NPN transistor 416.

The voltage on the terminal 403 is level shifted by diode-connected PNP transistors 417 to 422 and a 0.25-mA constant current source 423 that is connected to the terminal 414 of the DC-to-DC converter 37 and then applied to the base of an NPN transistor 424.

A 6-kΩ resistor 425 is bridged between the emitters of the NPN and PNP transistors 416 and 424. The voltage across the resistor 425 is equal to the voltage between the terminals 401 and 403, irrespective of ambient temperature. This is because the level shift amounts for the voltages on the terminals 401 and 403 are equal to each other. That is, although the level-shift diodes on the side of the terminal 403 is smaller in number than those on the side of the terminal 401 by two, the base-to-emitter voltage of transistor 424, corresponding to the level shift amount of one diode, is added to the level shift amount of six level-shift diodes on the side of the terminal 403, while the base-to-emitter voltage of transistor 416 that also corresponds to the level shift amount of one diode is subtracted from the level shift amount of eight level-shift diodes on the side of the terminal 401.

The collector of the PNP transistor 424 is connected to the terminal 401. Between the collector of the NPN transistor 416, which converts the voltage between the terminals 401 and 403 to current and sinks it, and the terminal 414 is connected a 0.407-mA constant current source 426. Thereby, the voltage between the terminals 401 and 403 is amplified very greatly and then output to the collector of the transistor 416.

To the collector of the NPN transistor 416 is connected the base of an NPN transistor 427 forming an emitter follower. The transistor 427 has its collector connected to the terminal 414 and its emitter connected to a 20kΩ load resistor 428, connected to the terminal 401, and to the base of an NPN transistor 429 forming an emitter follower. The transistor 429 has its collector connected to the terminal 414 and its emitter connected by diode-connected transistors 430 to 438 to the base of a PNP power transistor 404. To the base of the power transistor 404 is further connected the collector of an NPN transistor 439 which supplies the power transistor 404 with a base current and the transistor 429 with an emitter current. The collector of the NPN transistor 439 provides a current of about 5 mA. When the active inductance 53 allows the flow of a maximum current of 200 mA, the base current of the power transistor 404 will be 4 mA and the emitter current of the transistor 429 will be 1 mA because hFE is 50.

The emitter of the NPN transistor 439 is connected to the terminal 403. The base of the transistor 439 is connected to the tied base and collector of an NPN diode-connected transistor 440 having its emitter connected to the terminal 403. The transistor 440 is driven at its base and collector by a 1-mA constant current source 441 connected to the terminal 414. The NPN transistors 439 and 440 form a current mirror. The ratio of 1 mA to 5 mA depends on the ratio of transistor 440 to transistor 439 in size.

The reason why two emitter-follower stages are used to drive the base of the PNP power transistor 404 is that the transistor can take hFE as small as 50, and the load on the voltage amplified output of the collector of the NPN transistor 416 should be reduced.

Between the collector of the NPN transistor 416 and the terminal 442 is connected a built-on 0.1-μF capacitor 442 that is to be converted to an inductance.

The voltage across the active inductance, i.e., the voltage between the terminals 403 and 401 is defined as follows.

When a maximum current of 200 mA flows, there are a voltage drop of 0.5 V across the resistor 405, 0.7 V across the emitter-to-base path of the power transistor 404, 0.7 V between collector and emitter of the transistor 439 (this is equal to its base-to-emitter voltage, 0.7 V, which is required for its collector to maintain high impedance), a signal voltage magnitude of 0.42 V, and increments of the base-to-emitter voltages of the power transistor 303 and the transistor 439 when temperature falls by 30° C., 2×0.002×30 V. Thus, the voltage between the terminals 403 and 401 will be not more than $$-0.5\ V-0.7\ V-0.7\ V-2\times 0.002\times 30\ V-0.42$$
$$V=-2.44\ V$$

In order to minimize the power transmission loss introduced by the active inductance taking this point into account, the following trimming is performed to adjust the voltage between the terminals 403 and 401 to −2.44 V. That is, trimming is performed on the 0.407-mA constant current source 426 so as to adjust the voltage between the terminals 403 and 401 to −2.44 V while the terminal 402 is driven from the terminal 403 with a constant current (not more than 200 mA). Further, as compensation for variations in the base-to-emitter voltage of the PNP power transistor 404, trimming is performed on the 2.5-Ω resistor 405, with the constant drive current set to 200 mA, so as to adjust the voltage between the base of the power transistor 404 and the terminal 401 to −1.2 V.

As in the case of the circuit shown in FIG. 3, the circuit described above operates as an active inductance. However, the feature of the circuit shown in FIG. 4 is that the load current of the emitter-follower transistor 429 is furnished not by a resistor but by the current mirror comprised of the transistors 439 and 440. Thereby, an increase in the voltage across the active inductance is suppressed to the base-to-emitter voltage of a transistor.

The active inductance 52 connected to the plus terminal of the DC-to-DC converter 37 of FIG. 1 can also be realized by making some modifications, such as interchanging of PNP transistors with NPN transistors and vice versa, to the circuit shown in FIG. 4.

As described above, with the power and signal transmission system of the present embodiment, the generation of unwanted electromagnetic radiation can be prevented, and signal transmission and power transmission can be made, with high transmission efficiency secured, using the lines 2 without using large, expensive transformers and choke coils, making the transmitting side communication device 4 and the receiving side communication device 5 small and inexpensive. That is, the system can be made simple in construction and inexpensive.

Figure 5:
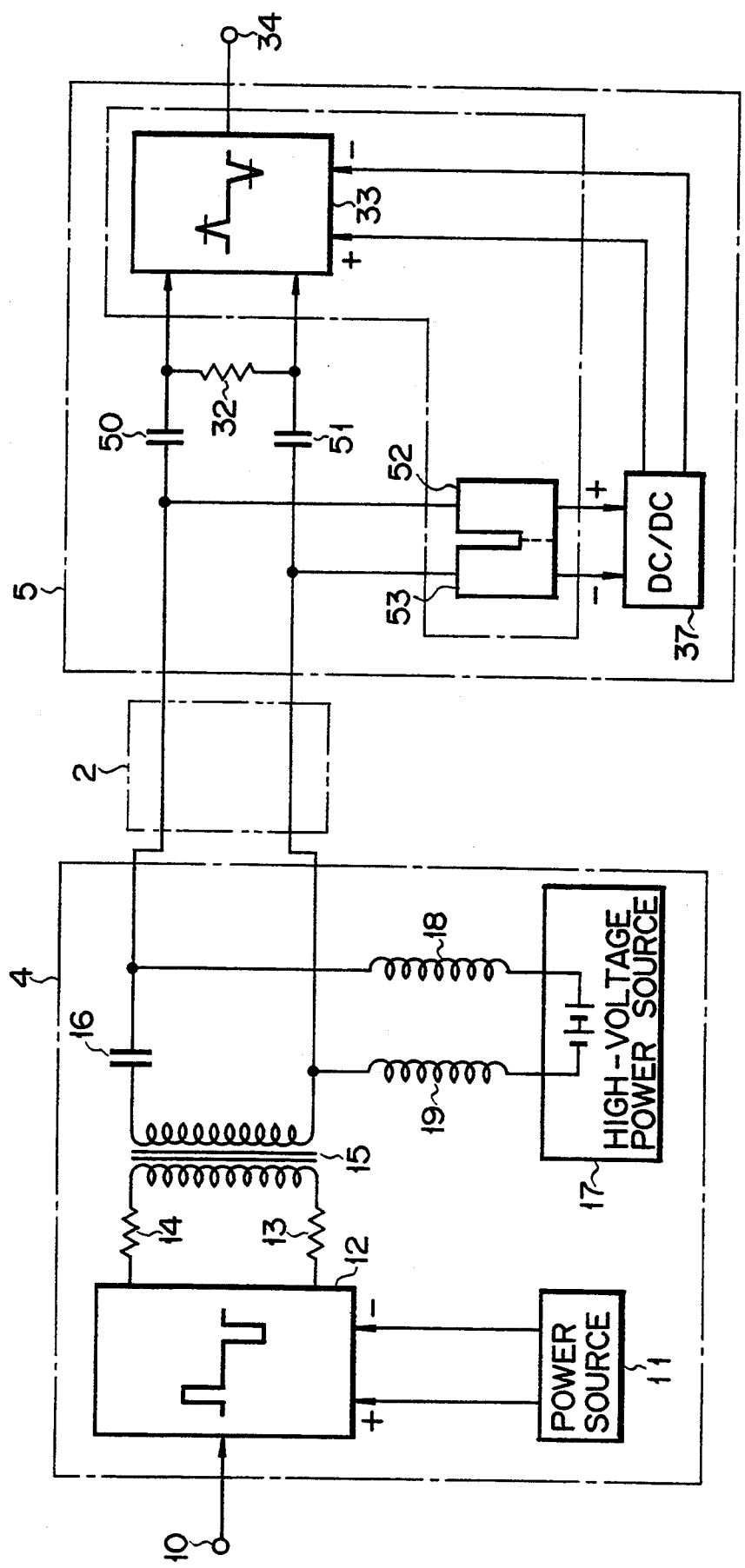
FIG. 5 is a block diagram of a power and signal transmission system according to another embodiment of the present invention.

In the above embodiment, the transmitting side communication device and the receiving side communication device both use active impedance. Alternatively, active impedance may be used in either of the transmitting and receiving devices as shown in FIGS. 5 and 6. That is, in the embodiment of FIG. 5, the transmitting circuit 12 is connected by resistors 13 and 14 to the primary winding of a transformer 15 whose secondary winding is connected to the lines 2 through a DC-blocking capacitor 16. The high-voltage source 17 is connected to the lines 2 by choke coils 18 and 19.

In the embodiment of FIG. 6, the receiving side communication device 5 is equipped with a transformer 31 and choke coils 35 and 36. The primary winding of the transformer 31 is connected by a DC-blocking capacitor 30. A resistor 32 is connected across the secondary winding of the transformer 31. The choke coils 35 and 36 are connected between the lines 2 and the DC-to-DC converter 37.

In the above embodiments, the transmitting circuit 12 is arranged such that common mode components will not be produced. However, this arrangement is not necessarily required. Although improved active inductances featuring low loss are used in the above embodiments, existing active inductances may be used instead.

Although the above embodiments have been described as making digital transmission, modifications to the transmitting and receiving circuits 12 and 33 will permit transmission of analog signals with no DC component.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A power and signal transmission system comprising:
   a first communication device including a transmitting circuit for outputting a transmission signal and first capacitive coupling means connected to said transmitting circuit for passing the transmission signal and blocking DC components;
   a transmission path connected to said first communication device and transmitting the transmission signal which has passed through said first capacitive coupling means;
   a second communication device including second capacitive coupling means connected to said transmission path for passing the transmission signal and blocking DC components and a receiving circuit for receiving the transmission signal which has passed through said second capacitive coupling means;
   power source means provided in one of said first and second communication devices, for producing a DC power to be supplied to the transmission path;
   converting means provided in the other of said first and second communication devices, for converting the DC power transmitted via the transmission path into operating power; and
   active inductance means provided in at least one of said first and second communication devices, for supplying the DC power to the transmission path and blocking the transmission signal, said active inductance means including:
   a first terminal connected to the transmission path,
   a second terminal connected to said power source means and grounded,
   a power transistor having a collector and an emitter connected to said first and second terminals, respectively,
   a first level shift circuit connected to said first terminal, for level-shifting a voltage appearing on said first terminal,
   a first transistor having a base connected to said first level shift circuit,
   a second level shift circuit connected to said second terminal, for level-shifting a voltage appearing on said second terminal,
   a second transistor having a base connected to said second level shift circuit, for converting a voltage appearing between said first and second terminals to a current,
   a resistor connected between bases of said first and second transistors, a voltage appearing across said resistor being equal to the voltage between said first and second terminals,
   a constant current source connected to a collector of said second transistor, and
   an emitter follower connected between a base of said power transistor and the collector of said second transistor.

2. The power and signal transmission system according to claim 1, wherein said power source means has first and second terminals, said transmission path has a pair of transmission lines, and said active inductance means comprises a first active inductance connected between the first terminal and one of said transmission lines and a second active inductance connected between the second terminal and the other of said transmission lines.

3. The power and signal transmission system according to claim 1, wherein said emitter follower comprises two emitter-follower stages, which are connected in series between said power transistor and said second transistor.

4. The power and signal transmission system according to claim 1, wherein said first and second level shift circuits each include an emitter follower transistor having a base connected to a corresponding one of said first and second terminals, a diode circuit connected to an emitter of said emitter follower transistor, and a constant current source connected to said diode circuit and a corresponding one of said first and second transistors.

5. The power and signal transmission system according to claim 1, further comprising a capacitor connected between the collector of said second transistor and ground.

6. A power and signal transmission system comprising:

a first communication device including a transmitting circuit for outputting a transmission signal and first capacitive coupling means connected to said transmitting circuit for passing the transmission signal and blocking DC components;

a pair of transmission lines connected to said first communication device, for transmitting the transmission signal which has passed through said first capacitive coupling means;

a second Communication device including second capacitive coupling means connected to said transmission path for passing the transmission signal and blocking DC components and a receiving circuit for receiving the transmission signal which has passed through said second capacitive coupling means;

power source means provided in said first communication device and having a pair of terminals connected to the transmission lines, respectively, for producing a DC power to be supplied to said transmission lines;

converting means provided in said second communication device and connected to said transmission lines, for converting the power transmitted via said transmission lines into operating power to be supplied to said receiving circuit; and a pair of active inductances provided between the terminals of said power source means and said transmission lines, respectively, for supplying the DC power of said power source to the transmission lines and blocking the transmission signal, each of said active inductances including:

a first terminal connected to a corresponding one of said transmission lines, a second terminal connected to said power source means and grounded, a power transistor having a collector and an emitter connected to said first and second terminals, respectively, a first level shift circuit connected to said first terminal, for level-shifting a voltage appearing on said first terminal, a first transistor having a base connected to said first level shift circuit, a second level shift circuit connected to said second terminal, for level-shifting a voltage appearing on said second terminal, a second transistor having a base connected to said second level shift circuit, for converting a voltage appearing between said first and second terminals to a current, a resistor connected between bases of said first and second transistors, a voltage appearing across said resistor being equal to the voltage between said first and second terminals, a constant current source connected to a collector of said second transistor, and an emitter follower connected between a base of said power transistor and the collector of said second transistor.

7. The power and signal transmission system according to claim 6, which includes a pair of additional active inductances connected between two input terminals of said converting means and said transmission lines, respectively, for supplying the DC power via the transmission lines to said converting means and blocking the transmission signal, each of said additional active inductances including:

a third terminal connected to said converting means, a fourth terminal connected to a corresponding one of said transmission lines, an additional power transistor having a collector and an emitter connected to said third and fourth terminals, respectively, a third level shift circuit for level-shifting a voltage appearing on said third terminal, a third transistor having a base connected to said third level shift circuit, a fourth level shift circuit for level-shifting a voltage appearing on said fourth terminal, a fourth transistor having a base connected to said fourth level shift circuit, for converting a voltage appearing between said third and fourth terminals to a current, an additional resistor connected between emitters of said third and fourth transistors, a voltage appearing across said additional resistor being equal to the voltage between said third and fourth terminals, a series circuit of an additional emitter follower and a diode circuit, which is connected between a collector of said fourth transistor and the base of said additional power transistor, and a current mirror circuit connected to said additional emitter follower, for supplying a load current thereto.

8. The power and signal transmission system according to claim 6, which includes a pair of choke coils connected between two input terminals of said converting means and said transmission lines, respectively.

9. The power and signal transmission system according to claim 6, wherein said transmitting circuit of said first communication device includes means for removing in-phase components from the transmission signal transmitted via the transmission lines.

10. The power and signal transmission system according to claim 7, wherein said emitter follower comprises two emitter-follower stages, which are connected in series between said power transistor and said second transistor.

11. The power and signal transmission system according to claim 7, wherein said additional emitter follower comprises two emitter-follower stages, which are connected in series between said additional power transistor and said fourth transistor.

12. The power and signal transmission system according to claim 7, wherein said first and second level shift circuits each include an emitter follower transistor having a base connected to a corresponding one of said first and second terminals, a diode circuit connected to an emitter of said emitter follower transistor, and a constant current source connected to said diode circuit and a corresponding one of said first and second transistors.

13. The power and signal transmission system according to claim 7, wherein said third and fourth level shift circuits each include an emitter follower transistor having a base connected to a corresponding one of said third and fourth terminals, a diode circuit connected to an emitter of said emitter follower transistor, and a constant current source connected to said diode circuit and a corresponding one of said third and fourth transistors.

14. The power and signal transmission system according to claim 7, further comprising a capacitor connected between the collector of said second transistor and ground.

15. A power and signal transmission system comprising:
- a first communication device including a transmitting circuit for outputting a transmission signal and first capacitive coupling means connected to said transmitting circuit for passing the transmission signal and blocking DC components;
- a pair of transmission lines connected to said first communication device, for transmitting the transmission signal which has passed through said first capacitive coupling means;
- a second communication device including second capacitive coupling means connected to said transmission path for passing the transmission signal and blocking DC components and a receiving circuit for receiving the transmission signal transmitted via said transmission lines;
- power source means provided in said first communication device and having a pair of terminals connected to the transmission lines, respectively, for producing a DC power to be supplied to said transmission lines;
- converting means provided in said second communication device and connected to said transmission lines, for converting the DC power transmitted via said transmission lines into operating power to be supplied to said receiving circuit; and
- a pair of active inductances connected between two input terminals of said converting means and said transmission lines, respectively, for supplying the DC power via the transmission lines to said converting means and blocking the transmission signal, each of said active inductances including:
  - a first terminal connected to said converting means,
  - a second terminal connected to a corresponding one of said transmission lines,
  - a power transistor having a collector and an emitter connected to said first and second terminals, respectively,
  - a first level shift circuit for level-shifting a voltage appearing on said first terminal,
  - a first transistor having a base connected to said first level shift circuit,
  - a second level shift circuit for level-shifting a voltage appearing on said second terminal,
  - a second transistor having a base connected to said second level shift circuit, for converting a voltage appearing between said first and second terminals to a current,
  - a resistor connected between emitters of said first and second transistors, a voltage appearing across said resistor being equal to the voltage between said first and second terminals,
  - a series circuit of an emitter follower and a diode circuit, which is connected between a collector of said second transistor and the base of said power transistor, and
  - a current mirror circuit connected to said emitter follower, for supplying a load current thereto.

16. The power and signal transmission system according to claim 15, which includes a pair of choke coils connected between the terminals of said power source means and said transmission lines, respectively.

17. A power and signal transmission system comprising:
- a first communication device including a transmitting circuit having two output terminals for outputting a transmission signal, a first pair of DC blocking capacitors, each being connected between one of said output terminals of said transmitting circuit and one of two transmission lines, and a DC power source having two terminals for supplying a DC power to said transmission lines;
- a second communication device including a receiving circuit having two input terminals for receiving the transmission signal transmitted from said first communication device via the transmission lines, a second pair of DC blocking capacitors, each being connected between one of the transmission lines and one of the two input terminals of said receiving circuit, and converting means having two terminals for converting the DC power supplied via the transmission lines into operating power and supplying the operating power to said receiving circuit;
- a first pair of active inductances provided in said first communication device, and connected between the terminals of said DC power source and the transmission lines, for supplying the DC power from said DC power source to the transmission lines and blocking the transmission signal, each of said first active inductances including:
  - a first terminal connected to a corresponding one of said transmission lines,
  - a second terminal connected to said power source means.
  - a first power transistor having a collector and an emitter connected to said first and second terminals, respectively,
  - a first level shift circuit connected to said first terminal, for level-shifting a voltage appearing on said first terminal,
  - a first transistor having a base connected to said first level shift circuit,
  - a second level shift circuit connected to said second terminal, for level-shifting a voltage appearing on said second terminal,
  - a second transistor having a base connected to said second level shift circuit, for converting a voltage appearing between said first and second terminals to a current,
  - a resistor connected between emitters of said first and second transistors, a voltage appearing across said resistor being equal to the voltage between said first and second terminals,
  - a constant current source connected to a collector of said second transistor, and
  - a first emitter follower connected between a base of said first power transistor and the collector of said second transistor; and
- a second pair of active inductances provided in said second communication device, and connected between the terminals of said converting means and the transmission lines, for supplying the power supplied via the transmission lines to said converting means and blocking the transmission signal, each of Said second active inductances including:
  - a third terminal connected to said converting means, a fourth terminal connected to a corresponding one of said transmission lines, a second power transistor having a collector and an emitter connected to said third and fourth terminals, respectively, a third level shift circuit for level-shifting a voltage appearing on said third terminal, a third transistor having a base connected to said third level shift circuit, a fourth level shift circuit for level-shifting a voltage appearing on said fourth terminal, a fourth transistor having a base connected to said fourth level shift circuit, for converting a voltage appearing between said third and fourth terminals to a current, a second resistor connected between emitters of said third and fourth transistors, a voltage appearing across said second resistor being equal to the voltage between said third and fourth terminals, a series circuit of a second emitter follower and a diode circuit, which is connected between a collector of said fourth transistor and the base of said second power transistor, and a current mirror circuit connected to said second emitter follower, for supplying a load current thereto.

18. The power and signal transmission system according to claim 17, wherein said transmitting circuit of said first communication device includes means for removing in-phase components from the transmission signal transmitted via the transmission lines.

19. A power and signal transmission system comprising:

a first communication device including a transmitting circuit having two output terminals for outputting a transmission signal, a first pair of DC blocking capacitors, each being connected between one of said output terminals of said transmitting circuit and one of two transmission lines, and a DC power source having two terminals for supplying a DC power to said transmission lines;

a second communication device including a receiving circuit having two input terminals for receiving the transmission signal transmitted from said first communication device via the transmission lines, a second pair of DC blocking capacitors, each being connected between one of the transmission lines and one of the two input terminals of said receiving circuit, and converting means having two terminals for converting the DC power supplied via the transmission lines into operating power and supplying the operating power to said receiving circuit;

a first pair of active inductances provided in said first communication device, and connected between the terminals of said DC power source and the transmission lines, for supplying the DC power from said DC power source to the transmission lines and blocking the transmission signal; and a second pair of active inductances provided in said second communication device, and connected between the terminals of said a capacitor having one terminal connected to a node between the collector of one of said PNP and NPN transistors and said constant current source, and a third level shift circuit for level-shifting a voltage appearing on said node and applying a level shifted voltage to the base of said power transistor, wherein an amount of level shift otained by said first level shift circuit and said NPN transistor is equal to that obtained by said second level shift circuit and said PNP transistor, and said second pair of active inductances each extract a load current of an emitter follower for driving the base of said power transistor from a constant current source using a current mirror circuit.

a capacitor having one terminal connected to a node between the collector of one of said PNP and NPN transistors and said constant current source, and a third level shift circuit for level-shifting a voltage appearing on said node and applying a level shifted voltage to the base of said power transistor, wherein an amount of level shift obtained by said first level shift circuit and said NPN transistor is equal to that obtained by said second level shift circuit and said PNP transistor, and said second pair of active inductances each extract a load current of an emitter follower for driving the base of said power transistor from a constant current source using a current mirror circuit.

* * * * *

UNITED STATES PATENT AND TRADEMARK OFFICE
CERTIFICATE OF CORRECTION

PATENT NO. : 5,396,555
DATED : March 07, 1995
INVENTOR(S) : Tomohisa SHIBATA et al It is certified that error appears in the above-indentified patent and that said Letters Patent is hereby corrected as shown below:

Claim 6, Column 13, Line 18 change "Communication" to --communication--.

Claim 17, Column 16, Line 35 after "means" insert --and grounded--.

Claim 17, Column 16, Line 66 change "Said" to --said--.

UNITED STATES PATENT AND TRADEMARK OFFICE
CERTIFICATE OF CORRECTION

PATENT NO. : 5,396,555
DATED : March 07, 1995
INVENTOR(S) : Tomohisa SHIBATA et al.

It is certified that error appears in the above-indentified patent and that said Letters Patent is hereby corrected as shown below:

Claim 19, Column 18, delete lines 17-31 and insert

--converting means and the transmission lines, for supplying the DC power supplied via the transmission lines to said converting means and blocking the transmission signal, wherein each of said first and second pair of active inductances comprises a pair of active inductances, each of which includes a first terminal connected to a corresponding one of the transmission lines, a power transistor having a collector connected to said first terminal, a second terminal connected to one of said DC power source and said converting means, a first resistor connected between said second terminal and an emitter of said power transistor,

UNITED STATES PATENT AND TRADEMARK OFFICE
CERTIFICATE OF CORRECTION

PATENT NO. : 5,396,555           Page 3 of 4
DATED      : March 07, 1995
INVENTOR(S): Tomohisa SHIBATA et al It is certified that error appears in the above-indentified patent and that said Letters Patent is hereby corrected as shown below:

a first level shift circuit for level-shifting a voltage appearing on said second terminal, a second level shift circuit for level-shifting a voltage appearing on said second terminal, a PNP transistor having a base to which a level shifted voltage from said first level shift circuit is applied, an NPN transistor having a base to which a level shifted voltage from said second level shift circuit is applied, a current source including a second resistor connected between emitters of said PNP and NPN transistors,

UNITED STATES PATENT AND TRADEMARK OFFICE
CERTIFICATE OF CORRECTION

PATENT NO. : 5,396,555
DATED : March 7, 1995
INVENTOR(S) : Tomohisa Shibata et al It is certified that error appears in the above-indentified patent and that said Letters Patent is hereby corrected as shown below:

a constant current source connected as a load to a collector of one of said PNP and NPN transistors and said constant current source, —

Signed and Sealed this

Eighteenth Day of July, 1995

Attest:

BRUCE LEHMAN

Attesting Officer    Commissioner of Patents and Trademarks